INVENTOR
Abe Kampinsky

United States Patent Office

3,341,151
Patented Sept. 12, 1967

---

3,341,151
APPARATUS PROVIDING A DIRECTIVE FIELD PATTERN AND ATTITUDE SENSING OF A SPIN STABILIZED SATELLITE
Abe Kampinsky, Lanham, Md., assignor to the United States of America as represented by the Administrator of the National Aeronautics and Space Administration
Filed July 23, 1965, Ser. No. 474,531
31 Claims. (Cl. 244—1)

ABSTRACT OF THE DISCLOSURE

A satellite, adapted to spin about an axis, having antenna elements for communicating with a remote body and a beam collimator rotatable with respect to the spin axis. The beam collimator is rotated at the same rate and in the opposite direction as the spin of the satellite to provide a directional beam stationary in space. Ejection apparatus enables the collimator to be jettisoned in event of rotational malfunction so that an omnidirectional beam may be provided about the spin axis. Signal processing circuitry operating in conjunction with the antenna elements provides information concerning the attitude of the satellite.

---

The invention described herein may be manufactured and used by and for the Government of the United States of America for Governmental purposes without the payment of any royalties thereon or therefor.

The present invention relates in general to communication satellites, and more particularly to an improved antenna system for providing a directive field pattern and attitude sensing of spin stabilized communication satellites.

In a communication network utilizing one or more communication satellites orbiting the earth or in any suitable space trajectory it is desirable that the field pattern of the satellite antenna system be high directive, that is, provide a unidirectional beam as a solid volume that may be directed towards a specific point. This point may be a selected area of the earth for earth-to-satellite communication, or another satellite for satellite-to-satellite communication. By utilizing such a beam, the spacecraft communication system may be enhanced by providing a high gain figure for the up-link receiving system as well as providing maximum effective radiated power density for the down-link transmitting system. One particularly successful type of communication satellite utilizes a spin stabilized spacecraft, that is, one which spins about an axis perpendicular to a line from the earth or some other reference point as the spacecraft traverses its orbit. Advantageously such a communication satellite may be maintained in a synchronous orbit to remain stationary relative to the earth, and when equipped with a unidirectional antenna system so as to provide a conical beam (e.g., 18° wide at the 3 db points) over the earth, provides an effective and efficient communication link with selected areas of the earth. It is also possible, by utilizing a larger antenna aperture to produce a conical beam less than 18°, and by redirecting the spin axis of the satellite when in orbit, to provide a communication link with other areas of the earth and with other satellites.

Although spin stabilization greatly simplifies the orientation system of the satellite, it introduces additional problems with respect to the antenna system. Thus, in order to provide a unidirectional antenna field pattern directed towards a specific point it is necessary to rotate the antenna pattern counter to the spin of the spacecraft and at the same angular velocity.

In present antenna systems for spin stabilized communication satellites the above problem is obviated by utilizing a radiation pattern that is omnidirectional around the spin axis and directive parallel to the spin axis, or by providing a conical beam perpendicular to the spin axis by disposing a number of spaced radiating elements circumferentially around the spin axis, and causing counter rotation of the beam so that it remains stationary in space. A spin stabilized communication satellite utilizing a conical beam is described in an article entitled "Advanced Syncom," Space/Aeronautics magazine, September 1963. In such a system the beam is rotated by electrically controlled phase shifters that vary excitation phase of the array synchronously with the spin of the satellite to cause counter rotation at the same angular velocity. The control electronics for rotating the beam of such systems are complex and the number of components required greatly decrease the reliability. It is apparent that in a practical operating communication system high reliability is required, and since it is necessary that the satellite operate unattended for a number of years, it is desirable to minimize the number of electronic components that may be a cause of malfunction. It is also desirable, in the event of failure of the control electronics for rotating the beam, that the antenna system will continue to function as an omnidirectional antenna with reduced gain so that all communication with the satellite is not lost. In the particular instant where phase shifters feeding each radiating element are electrically controlled omnidirectional operation is difficult to achieve in that it requires the current to all phase shifters be identical or be zero.

In addition, present systems utilizing electrically controlled phase shifters to feed an array of radiating elements are frequency sensitive, with each array (for either transmitting or receiving) and its control electronics adapted to operate at a fixed frequency and narrow bandwidths. The frequency cannot be conveniently modified to either transmit or receive at other frequencies without corresponding modification of the spacing of the radiating elements and of the phse shifters feeding the elements of the array. Thus, since in present and proposed communication satellite systems the signal is received at one frequency and retransmitted at another frequency, the unidirectional pattern is utilized only in conjunction with the transmitting antenna, with a separate omnidirectional receiving antenna being used.

As a further consideration, any antenna system should also have utility in conjunction with the attitude sensing and control system of the satellite. Thus the elements of the array producing a unidirectional beam should preferably be sensitive to the polarization, phase angle, or some other characteristic of a received radio frequency signal to provide information indicative of the attitude of the satellite or its spin axis with respect to the earth or some other reference point that may be telemetered to the earth or supplied to the satellite stabilization and attitude control systems.

It is therefore an object of the present invention to provide a simple, reliable and light weight antenna system for a spin stabilized communication satellite that produces a unidirectional field pattern in the form of a conical beam, and wherein the beam pointing is controlled by apparatus on board the satellite or alternately from ground signals to position the beam upon command.

A further object of the present invention is to provide a unidirectional antenna system for a spin stabilized communication satellite operable at different widely separated frequencies and for simultaneous reception and transmission of information from and to the earth and other satellites.

Another object of the present invention is to provide a unidirectional transmit-receive antenna system for a spin stabilized communication satellite, which antenna system may also be utilized to determine the attitude of the spin axis of the satellite.

Still another object of the present invention, in a antenna system which produces a directive, high gain despun field pattern for a spin stabilized spacecraft, is to provide a fail-safe arrangement which results in an omnidirectional medium gain antenna field pattern in the event of failure of the despin mechanism.

Further objects, as well as the features and attending advantages of the present invention will become apparent from the following description when taken in conjunction with the accompanying drawings, in which.

Figure 1:
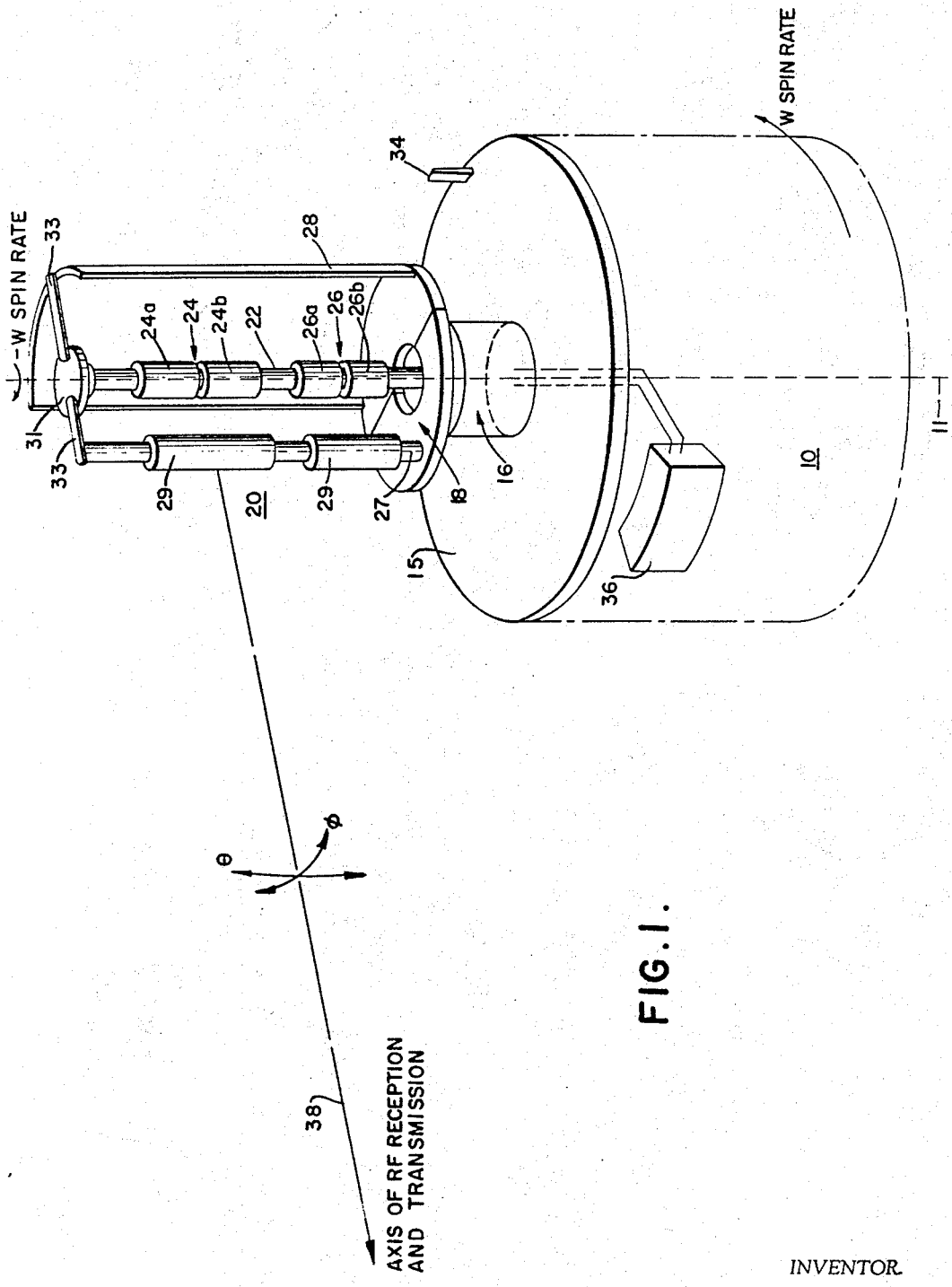
FIGURE 1 is a perspective view illustrating the communication satellite of the present invention.

In accordance with one aspect of the present invention a primary antenna including one or more radiating elements for each receive and transmit channel is rigidly fixed coextensive with the spin axis of a spin stabilized spacecraft. A beam collimator such as a cylindrical parabolic reflector is positioned circumferentially from the radiating elements and adapted to rotate about the spin axis. The radiating elements provide beam directivity in the elevation plane and the beam collimator provides directivity in the azimuth plane. A motor rotates the beam collimator at a rate synchronous with the spacecraft spin rate and in an opposite direction to effectively despin the antenna field pattern. Synchronization of the rotation of the beam collimator with the spacecraft spin rate is achieved by a control circuit responsive a spacecraft reference such as a sun line. In addition, the rotation of the beam collimator may be controlled by a telemetered command signal to enable earth station control of the antenna beam position independently of spacecraft reference and/or during satellite solar eclipses or failure of the sensors providing the sun line.

In accordance with another aspect of the invention, the beam collimator that rotates about the radiating elements of the primary antenna is provided as a single separable unit that is readily separated from the spacecraft. This unit may be ejected by pyrotechnic devices and the like upon failure of the drive motor and/or associated control electronics providing rotation about spacecraft spin axis, or upon command telemetered from a ground station. The collinear radiating elements remain fixed to the spacecraft to provide a medium gain antenna in the azimuth plane providing an omnidirectional field pattern about the spacecraft spin axis.

In accordance with a further aspect of the invention individual radiating elements of one or more selected primary antennas are fed to sum and difference channels that combine signal components received therefrom. The sum channel provides a radio frequency signal axis between the satellite and a remote point on the earth. The difference channels produce error signals, derived from the difference in phase or amplitude of a received radio frequency signal, to provide an indication of spacecraft attitude in the elevation plane with respect to the radio frequency signal axis. The sum channel also functions as a communication channel to receive information from the ground station or other satellites. Additional radiating elements may be disposed on opposite sides of the radiating elements that are coextensive with the satellite spin axis to provide an indication of spacecraft attitude in the azimuth plane. This arrangement allows the same basic antenna system providing the unidirectional despun beam for the communication channel of a spin stabilized satellite to also provide information indicative of satellite attitude in both the azimuth and elevation planes.

In accordance with a further aspect of the invention a number of additional radiating elements may be stacked coextensive wtih the satellite spin axis and the height of the beam collimator extended so that additional channels for independent transmission and/or reception at different widely separated frequencies may be provided for by the same basic antenna system.

Referring now to FIGURE 1 there is illustrated a space vehicle, such as satellite 10, in earth orbit. Although the invention is not so limited, satellite 10 may, for example, be in synchronous orbit, i.e., in orbit around the equatorial plane of the earth and traveling in the same direction and at the same angular velocity as the earth does in rotating about its axis. In such an orbit, satellite 10 remains stationary over a selected geographical area of the earth. To provide attitude stability satellite 10 is adapted to spin at an angular velocity about its own axis 11 as it tranverses its orbit. For a synchronous orbit in the equatorial plane spin axis 11 is parallel to earth's rotational axis and for other orbits spin axis 11 may be perpendicular to the orbital plane. In addition, satellite 10 may be utilized to provide a spin axis fixed in inertial space, either in orbit or as a deep space trajectory. Techniques for placing satellite 10 into orbit, for spinning it about its axis, and for orientating this spin axis relative to the earth are known and in detail form no part of the present invention.

Disposed on one end surface 15 of satellite 10 is motor 16 and a turntable 18, providing rotatable support for antenna system 20. Motor 16 is shown as external to spacecraft 10 for clarity of illustration. However, as shown in more detail in FIGURES 2 and 3, motor 16 may also be positioned within spacecraft 10. Antenna system 20, in turn, includes center mast 22 having a number of primary antennas 24 and 26 disposed thereon, reflector 28 and parasitic radiators 29. Reflector 28, a cylindrical parabolic reflector in the embodiment shown, functions to collimate the field pattern of the primary antennas in the φ or azimuth plane. Parasitic radiators 29, the use of which is optional, provide increased efficiency and directivity by redirecting energy back into reflector 28. They also provide a counter weight for reflector 28 and increase mechanically rigidity. Center mast 22 is rigidly secured to spacecraft 10 and extends through turntable 18, coextensive with spin axis 11.

Primary antennas 24 and 26 each include one or more radiating elements positioned coextensive with spin axis 11 and adapted to provide directivity in the θ or elevation plane. Each radiating element may be considered as being a discrete radiator equivalent to a line source aperture. For the purpose of illustration two half-wave, center fed dispoles, 24a, 24b and 26a, 26b, are shown as a collinear array of radiating elements for primary antennas 24 and 26, respectively. It is to be understood, however, that other radiating elements may be used, with spacing and phasing of feed currents selected to provide directivity in the elevation plane. Each primary antenna 24 and 26, and the elements thereof, may be adapted to operate at different frequencies. Although two primary antennas are shown, any number may be stacked on center mast 22, with each operable at a different frequency, to supply separate channels for satellite 10. In addition, since reciprocity applies, each primary antenna may be used for either transmission or reception of radio frequency signals.

Reflector 28 has one end mounted on turntable 18. Although shown as a circular disc, turntable 18 may be of other shapes, and may have portions removed to reduce weight and rotational inertia. In instances where parasitic radiators 29 are not used, the side of turntable 18 opposite to reflector 18 may be provided with a counter weight for balancing, and a non-reflection rod such as rod 27 may be utilized to provide additional mechanical rigidity. Parasitic radiators 29, which may be resonantly tuned cylindrical reflectors, are disposed on rod 27, with one end of rod 27 also mounted on turntable 18. The other end of both reflector 28 and rod 27 is joined to bearing 31 by support members 33. Bearing 31, in turn, is supported by center mast 22. This arrangement provides a unitary reflecting structure, including turntable 18 with cylindrical parabolic reflector 28 and parasitic radiators 29 mounted thereon, that is rotatable about primary antennas 24 and 26 on center mast 22. Rotation of turntable 18 is provided by the operation of motor 16 in conjunction with the associated control electronics 36. As will be subsequently described, control electronics 36 responds to timing reference pulses generated by solar sensor 34, located on the periphery of surface 15 of satellite 10, to generate suitable wave forms for motor 16 to cause turntable 18 and hence reflector 28 and parasitic radiators 29 to rotate at the same angular velocity and in the opposite direction as the spin of satellite 10.

The combined effects of the collinear elements of primary antenna 24 and the rotation of cylindrical parabolic reflector 28 and parasitic radiator 29 provides a field pattern in the form of a unidirectional beam along radio frequency signal axis 38. A similar pattern is also provided for antenna 26. Primary antenna 24, including its collinear elements 24a and 24b, may be utilized as a transmitting antenna at one frequency (for example, 6 gc.), and primary antenna 26, including collinear elements 26a and 26b, may be considered a receiving antenna at a second frequency (for example, 4 gc.).

Figure 2:
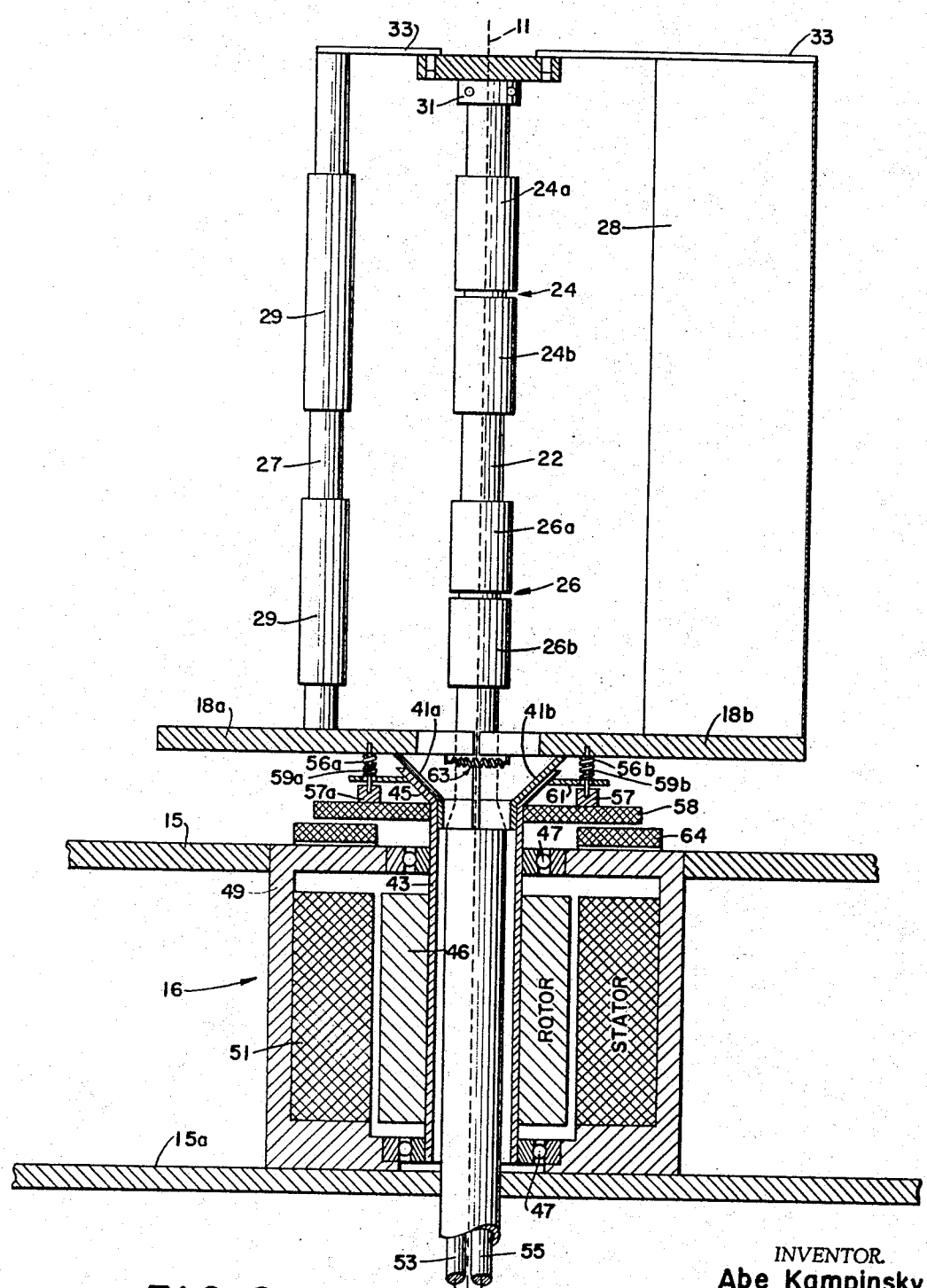
FIGURES 2 and 3 are elevational views, in partial section, illustrating the antenna system and the ejection mechanism therefor in accordance with the present invention.
Figure 3:
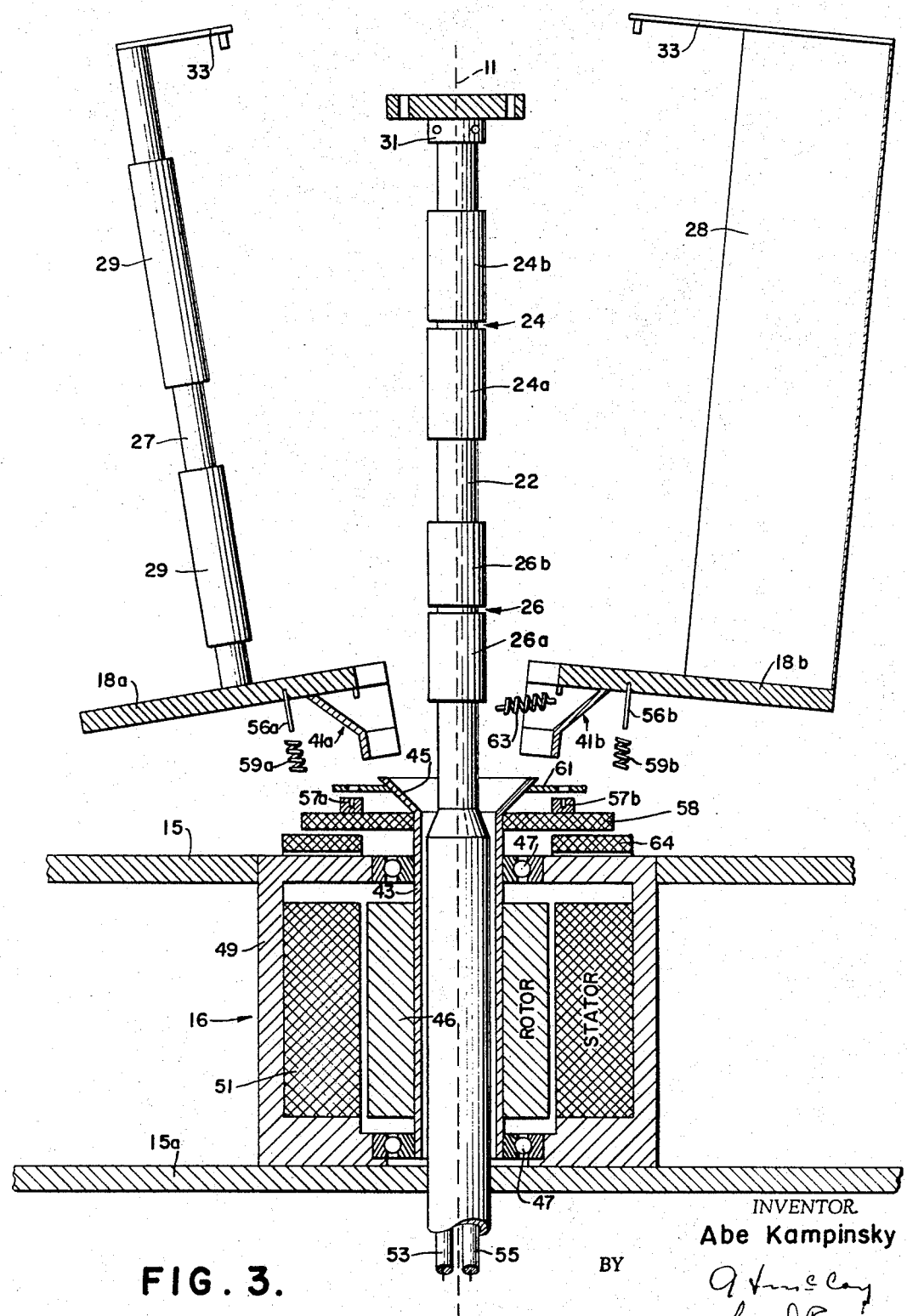

FIGURES 2 and 3 illustrate antenna system 20 and motor 16 in more detail, and show the manner in which two halves of turntable 18, one carrying reflector 28 and the other carrying parasitic radiators 29 if used, may be ejected in the event of failure of the rotational control electronics so that primary antennas 24 and 26 may continue to function as medium gain omnidirectional antennas.

Turntable 18 is split into two halves 18a and 18b through its center of rotation. Each half 18a and 18b has a tapered locating flange, 41a and 41b, respectively, adapted to extend into mating conical receptacle 45 on the end of tube 43 when turntable 18 is in position. Tube 43 is secured to and extends coaxially through rotor 46 of motor 16. Preferably, but not limited to, motor 16 is a synchronous motor having a permanent magnet rotor and a stator having two or more sets of windings to produce a rotating field when energized by phased sine waves or square wave pulse trains. The significant fact is that the speed of motor 16 is in synchronism with periodic signals applied to its stator windings. Bearings 47 provide rotational support between the ends of tubing 43 and frame 49 of motor 16. Frame 49 also houses stator windings 51 of motor 16. Preferably, and as previously mentioned, motor 16 may be contained within spacecraft 10, and to this end the top of frame 49 is secured to surface 15 so that the body of motor 16 extends therebelow. In this instance the lower end of mast 22 extends through tube 43 and is secured to a bulkhead 15a or a similar support member located within spacecraft 10. Thus rotor 46, tube 43, conical receptacle 45, and the two halves 18a and 18b of turntable 18 rotate when motor 16 is energized.

It should be noted at this point that mast 22 is rigidly secured to spacecraft 10 and extends coaxially through tube 43 coextensive with spin axis 11, with the upper end of mast 22 providing support for the radiating elements such as elements 24a, 24b and 26a, 26b that make up primary antennas 24 and 26. In addition, mast 22 itself is hollow so that transmission lines 53 and 55 may be threaded therethrough to provide RF feed for the radiating elements of primary antennas 24 and 26. By this arrangement it is possible to provide RF feed for any desired number of radiating elements on mast 22 without the use of rotary electrical joints.

Considering further the manner in which the two halves of turntable 18 are ejected, explosive release bolts 56a and 56b are utilized to hold the two halves 18a and 18b in position. One end of each of bolts 56a and 56b is secured to respective ones of turntable halves 18a and 18b. The other end of each of bolts 56a and 56b terminates in a pyrotechnic squib, 57a and 57b, respectively. These squibs are mounted on pancake-type coil 58, which coil is positioned coaxially around and secured to tube 43. Coil 58 forms the secondary winding of a transformer by which A-C energy is coupled to the series-connected squibs 57a and 57b. Thus turntable 18 is effectively bolted to shaft 43 by explosive release bolts 56a and 56b, and rotates freely with shaft 43 at the speed of motor 16.

Ejection springs 59a and 59b are disposed around bolts 56a and 56b, and maintained under compression between shoulder 61 extending from conical receptacle 45 and the undersurface of turntable 18. In addition, one or more springs 63 are coupled between turntable halves 18a and 18b and maintained under compression. A second pancake-type coil 64, providing the primary winding of a transformer, is mounted on motor frame 49, mechanically separate from coil 58. Coils 58 and 64 provide transformer action so that energizing coil 64 with an A-C or pulse voltage wave induces a voltage in coil 58. This induced voltage, in turn, is supplied to squibs 57a and 57b, conneced in series across coil 58. These squibs, for example, may contain a filament wire and explosive charge which, when ignited, shears bolts 56a and 56b. Thus to eject turntable halves 18a and 18b, including reflector 28 and parasitic radiators 29, a voltage is applied to coil 64 to induce an igniting voltage in coil 58. When bolts 56a and 56b are sheared, springs 59a and 59b eject turntable halves 18a and 18b coaxially along center mast 22. Concurrently springs 63 separate turntable halves 18a and 18b radially from center mast 22 and provide an outward force. Turntable halves 18a and 18b received an initial separation velocity so that they drift free of satellite 10, and primary antennas 24 and 26 operate as medium gain antennas omnidirectional in the azimuth plane, with directivity in the elevation plane provided by the collinear radiating elements thereof.

Figure 4:
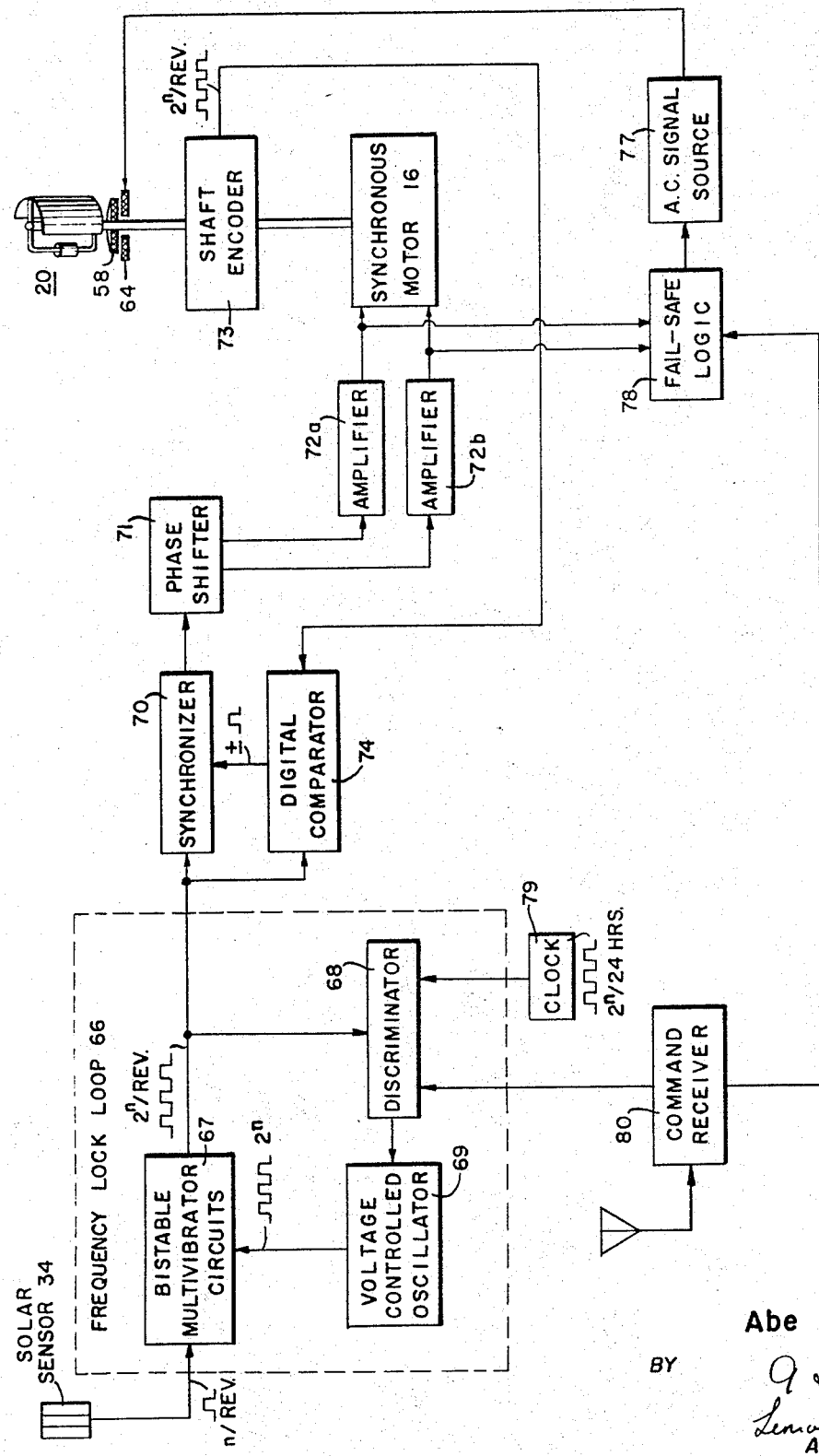
FIGURE 4 is a schematic circuit diagram illustrating typical control electronics for the antenna turntable drive motor of the present invention.

The control electronics for controlling the speed of motor 16 synchronously with the spin of satellite 10 is shown in FIGURE 4. Reference pulses, indicative of the satellite spin rate, are produced by solar sensor 34. Typically solar sensor 34 includes photosensitive elements such as cadmium sulfide or silicon cells, suitably masked to provide an electrical response when sunlight passes through a narrow slit opening. Thus a pulse is produced for every crossing of the sun line with the number of pulses $n$ per unit time indicative of the spin rate of satellite 10. Alternately an infra-red (IR) sensor may be positioned on satellite 10 to provide a pulse for every crossing of the earth-sky interface, or an antenna (such as a simple horn) may be positioned so that in conjunction with a radio frequency receiver a pulse is produced for every crossing of a signal axis extending between satellite 10 and a ground station.

The output of solar sensor 34 is coupled to the input of frequency lock loop 66, which loop generates a train of square wave pulses of frequency $2^n$, precisely related by a whole number to the number of pulses $n$ per unit of time produced by solar sensor 34. As will be subsequently described, if the spin rate of satellite 10 changes from $n$ to $n^1$ the output of frequency lock loop 66 changes to frequency $(2n)^1$. Typically frequency lock loop 66 includes a chain of multivibrator circuits 67, discriminator 68, and voltage controlled oscillator 69. Such circuits and the components thereof are of the type utilized in computing and telemetry systems, and in detail from no part of the invention.

The output of frequency lock loop 66 is fed to synchronizer 70 and thence to phase shifting network 71. In normal operation synchronizer 70 supplies a square wave pulse train in synchronism with the output of frequency lock loop 66. Phase shifting network 71, which may include suitable R-L-C circuits, divides the output of synchronizer 70 into two pulse trains of the same frequency and in phase quadrature with one another. These bi-phase signals (90° phase difference) are amplified by linear amplifiers 72a and 72b and supplied to motor 16. As mentioned, motor 16 may be a two-phase synchronous motor energized by bi-phase pulse trains. By way of example, motor 16 may have a 64-tooth rotor and a 64-tooth stator. When energized with a square wave pulse train the rotor will move one-quarter tooth width for every square wave pulse, requiring 256 pulses to effect 360° rotation of the rotor. This particular type motor thus provides a 4-to-1 electrical "gearing" ratio for vernier control. It is to be understood that motor 16 may also be energized by sinusoidal waveforms; however, the digital control circuitry shown utilizes known design techniques, is easily implemented, and is relatively insensitive to environmental conditions.

Considering further frequency lock loop 66, the bistable multivibrator circuits designated at 67, which may be comprised of a plurality of multivibrator flip-flops connected as a counter chain in a known manner, are "set" or synchronized once each cycle of the spin of satellite 10 by the output of solar sensor 34. The multivibrator flip-flops of the counter chain are then sequentially triggered by the output of voltage controlled oscillator 69 to supply a square wave pulse train to synchronizer 70 and thence to phase shifting network 71. The output of the bistable multivibrator circuits 67 is also fed to discriminator 68, and the output of discriminator 68 is supplied to voltage controlled oscillator 69. Discriminator 68 which may be a frequency discriminator of known type, produces a vector output signal that is supplied as an analog control voltage to voltage controlled oscillator 69. When the output square wave pulse train of multivibrator circuits 67 is related to the spin rate of satellite 10 by a specified whole number (i.e. 256 pulses per revolution) the frequency lock loop is considered to be "in lock" and the output of discriminator 68 is at a reference level. Under these conditions there is no change in the frequency of voltage controlled oscillator 69. If there is a change in the spin rate of satellite 10 and hence the number of pulses per unit time provided by solar sensor 34 there is also a change in the output square wave pulse train of multivibrator circuits 67 that is reflected in the output of discriminator 68 in terms of both amplitude and polarity with respect to its reference level, and this produces a corresponding change in the frequency of voltage controlled oscillator 69. As the result of this action the frequency lock loop is again brought into lock and the output square wave pulse train of multivibrator circuits 67 is again related to the spin rate of satellite 10 by the same specified whole number (i.e. 256 pulses per revolution).

In order to provide precise control of the position of turntable 18 shaft encoder 73 may also be mechanically coupled to the rotor of motor 16 to produce a reference pulse and a square wave pulse train for each revolution thereof. Typically shaft encoder 73 may produce the same number of pulses per revolution of turntable 18 as produced by frequency lock loop 66 for one revolution of satellite 10. The output of shaft enocder 73 is fed to digital comparator 74. This circuit compares the output of shaft encoder 73 (indicative of the speed of rotation of turntable 18) and the output of frequency lock loop 66, and produces an output pulse having a polarity indicative of the difference therebetween. This pulse is applied to synchronizer 70. Synchronizer 70 includes adder and inhibit circuitry so as to permit the addition or subtraction of pulses to the square wave pulse train generated by frequency lock loop 66 to advance or retard the rotor of motor 16 in a direction to lock output of shaft encoder 72 to the output of frequency lock loop 66. Thus there is provided a closed loop system that compensates for variations in the speed of motor 16 and for slippage or "dropped" pulses in the control of motor 16 so that the rotation of turntable 18 may be precisely locked to the spin rate of satellite 10.

Provision is also made to compensate for the rotation of the earth about its own axis by advancing the rotor of motor 16 one revolution per day. To this end clock source 79 generates a specified number of pulses per day (i.e. 256 pulses per day to affect a 360° rotation of the rotor of motor 16). These pulses are added to discriminator 68 to thereby increase the control voltage supplied to voltage controlled oscillator 69 and hence increase the frequency thereof a corresponding amount. This results in a like increase in the output square wave pulse train of frequency lock loop 66 to advance the rotation of motor 16 one revolution per day. In addition, pulses may be added or subtracted to discriminator 68 in response to a ground command signal transmitted to command receiver 80. The number of pulses from command receiver 80 will increase or decrease the control voltage supplied to voltage controlled oscillator 69 by discriminator 68 to effectively advance or retard the positioning of the rotor of motor 16. This arrangement enables a ground command signal to be utilized for initial positioning and for subsequent corrections of the alignment or positioning of the rotor of motor 16. Thus, for example, every pulse added or subtracted by ground command will advance or retard the rotor of motor 16 and hence the positioning of turntable 18 approximately 1.4°. In addition, the ground command signal may be utilized to provide control for the output of frequency lock loop 66 in the event the output from solar sensor 34 is lost, or during eclipse of the spacecraft by earth position.

An A-C power source 77, such as a triggered oscillator, is coupled to coil 64 to provide energy for igniting squibs 57a and 57b (FIGURES 2 and 3) for ejecting turntable 18 from satellite 10. Under normal operation power source 77 is electrically inactivated, with squibs 57a and 57b ignited if rotation failure of turntable 18 occurs or upon ground command. Since the satellite is continuously telemetering information to a ground command station indicative of its operating conditions, a malfunction of motor 16 and/or its associated control electronics may be determined and squibs 57a and 57b may be ignited from the ground by command. Thus the oscillator of signal source 77 may be triggered by fail-safe logic network 78, with logic network 78 responsive to a predetermined condition of the output of amplifiers 72a and 72b that indicates improper operating levels or a malfunction in the control electronics for motor 16, or responsive to a signal transmitted from the ground and received by command receiver 80.

Figure 5:
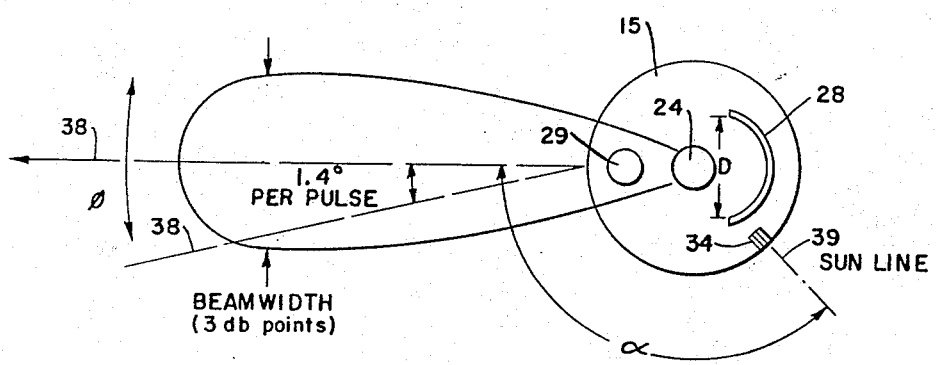
FIGURE 5 is a representation of the antenna field pattern in the azimuth plane in accordance with the present invention.
Figure 6:
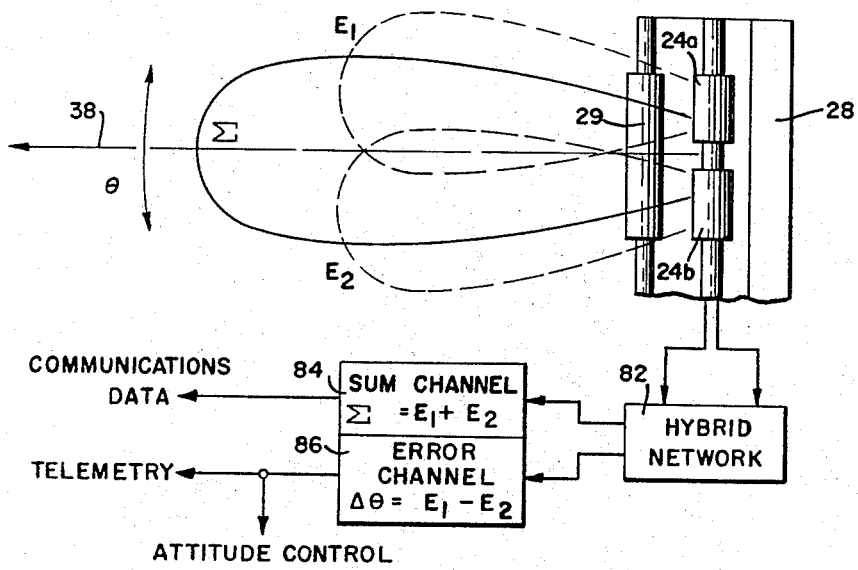
FIGURE 6 is a representation of the antenna field pattern in the elevation plane in accordance with the present invention.

The resulting antenna pattern produced by one of the primary antennas (such as primary antenna 24) of antenna system 20 of FIGURE 1 is illustrated by FIGURES 5 and 6. FIGURE 5 is a top view showing the resulting despun beam in the $\phi$ or azimuth plane. The beam width in this plane is related to the physical aperture dimension D ( in wavelengths) such that $\phi$ at the 3 db points is approximately $69(\lambda/D)$ degrees. FIGURE 6 is a side view showing both the resultant beam and the contributions thereto by collinear radiating elements 24a and 24b of primary antenna 24 in the θ or elevation plane. The beam width in this plane is determined primarily by the number of collinear radiating elements utilized for each primary antenna. It is to be understood that each primary antenna, including the collinear radiating elements thereof, are selected to operate at a given frequency and may be used for either transmission or reception. Although only primary antenna 24 is illustrated, the same pattern is obtained for primary antenna 26, and for other antennas which may be stacked on center mast 22. FIGURE 6 also illustrates the manner in which a primary antenna, including the collinear radiating elements thereof, may be utilized in conjunction with a received data channel to provide an error signal indicative of the attitude of the spin axis of satellite 10 relative to a reference axis provided by RF signal axis 38.

Also shown in FIGURE 5 is the angle α between the RF signal axis 38 and the sun line 39, established by solar sensor 34 once during each revolution of satellite 10. When satellite 10 is in orbit angle α is maintained by the synchronous operation of motor 16 in response to the square wave train pulses produced by frequency lock loop 66, with the pulse produced by solar sensor 34 providing a reference signal for sun line 39. Initial positioning of turntable 18, and hence reflector 23, to establish RF signal axis 38 in the azimuth plane, is provided by transmitting command pulses to command receiver 80 to be supplied to frequency lock loop 66 to advance or retard the position of the rotor or motor 16 by small angular increments. As noted, for example, with satellite 10 spinning at 100 r.p.m. and with frequency lock loop 66 producing 256 pulses per revolution, this increment is approximately 1.4° per pulse added or subtracted. In addition, it is possible to subsequently vary angle α and thus re-direct RF signal axis 38 to a different point on earth or towards other satellites by command pulses transmitted to command receiver 80.

In FIGURE 6 the antenna "sum" pattern in the θ or elevation plane is indicated by Σ and the "difference" pattern indicated by lobes $E_1$ and $E_2$. Radiating elements 24a and 24b are coupled, via hybrid networks 82, to sum channel 84 and error channel 86, respectively. Hybrid network 82 may, for example, be a conventional hybrid ring, with in-phase connection for the sum pattern and anti-phase connection for the difference pattern, such that signals in sum channel 84 add and signals in error channel 86 subtract. Thus when an RF signal is received from a fixed ground station along RF signal axis 38 the total signal is processed through sum channel 84 to provide the desired communications link. When the attitude of satellite 10 in the θ plane is such that lobes $E_1$ and $E_2$ are symmetrical with respect to RF signal axis 38, no error signal is produced, the contributions of lobes $E_1$ and $E_2$ being cancelled in error channel 86. When the attitude of satellite 10 deviates from a prescribed orientation in the θ plane an error signal, as a vector quantity, is produced in error channel 86 which may be supplied to the satellite stabilization system or telemetered to a ground command station so that corrective action may be taken.

Figure 8:
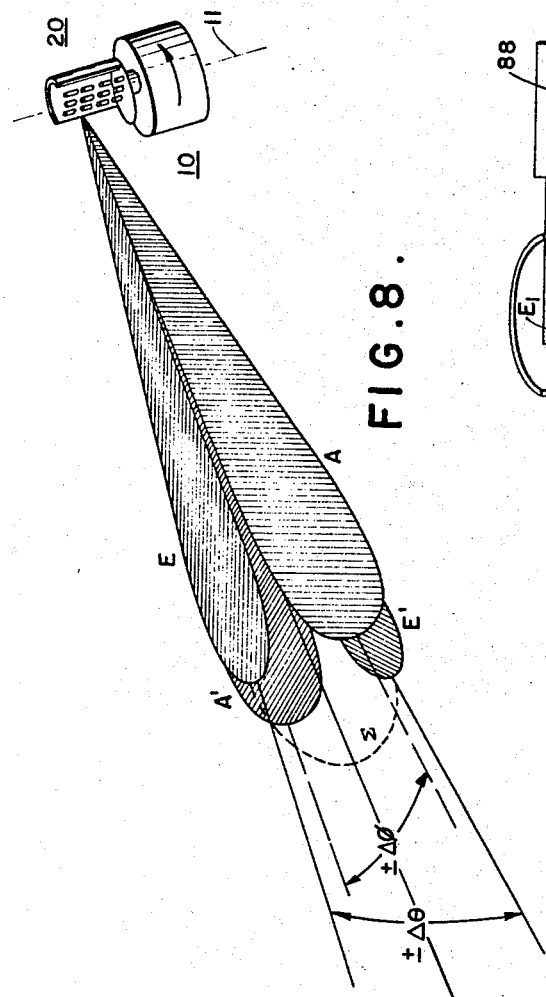
FIGURE 8 is a representation, in a perspective view, of the antenna field patterns produced by the embodiment of the invention of FIGURE 7.
Figure 7:
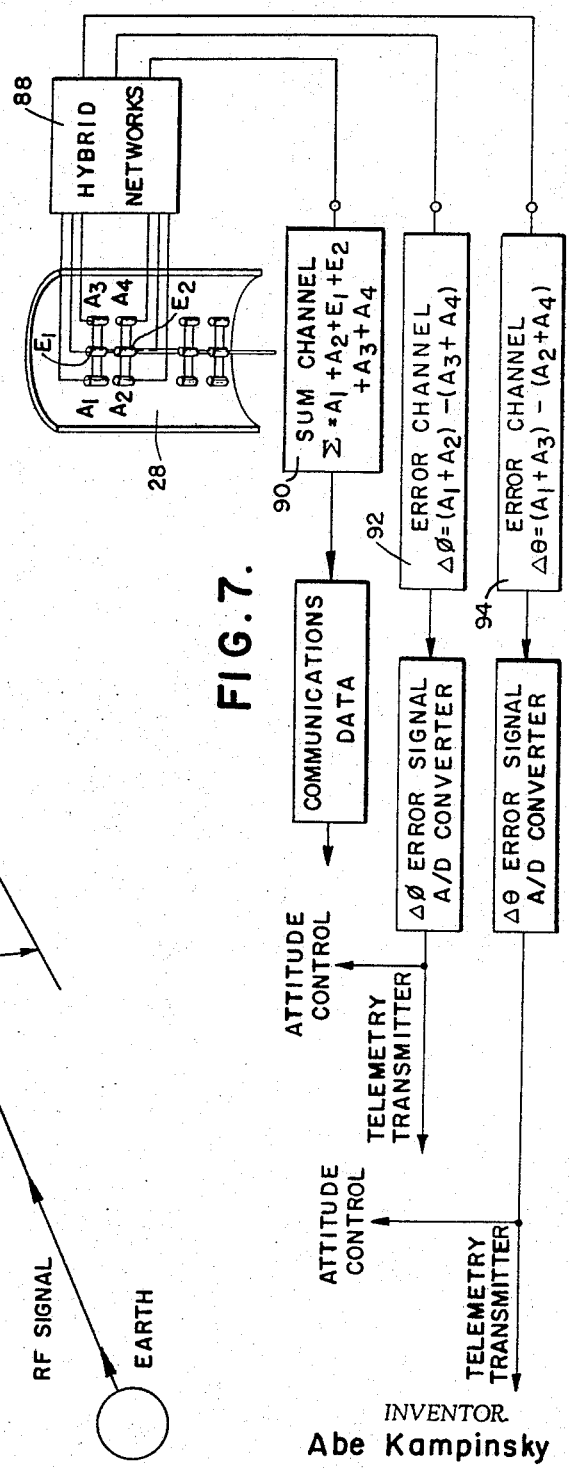
FIGURE 7 is a schematic representation of an embodiment of the present invention for providing attitude sensing in two orthogonal planes.

FIGURES 7 and 8 show a further embodiment wherein antenna system 20 may be modified to provide attitude sensing in both the θ (vertical) and the φ (horizontal) planes. To this end additional radiating elements are provided for one or more channels of a selected frequency and are positioned on either side of the primary antennas extending along the spin axis of satellite 10. These additional radiating elements may be structurally similar to elements 24a and 24b discussed in conjunction with the previous figures, and may be secured as an assembly to center mast 22 as shown in FIGURE 7. For the purpose of illustration, the elements corresponding to radiating elements 24a and 24b in the previous figures are indicated by $E_1$ and $E_2$ in FIGURE 7, and the additional radiating elements are indicated by $A_1$, $A_2$ and $A_3$, $A_4$ respectively. From the resulting antenna field patterns shown in FIGURE 8 it may be seen that the total antenna field pattern Σ is comprised of lobes E, $E^1$ in the θ (elevation) plane and lobes, A, $A^1$ in the φ (azimuth) plane.

Radiating elements $E_1$ and $E_2$, $A_1$ and $A_2$, and $A_3$ and $A_4$ respectively, are coupled to hybrid network 88 and thence to sum channel 90 and to error channels 92 and 94. Sum channel 90 receives and adds the signal components from all radiating elements and thus provides a data channel. Error channels 92 and 94 receive signals only from the additional radiating elements $A_1$, $A_2$ and $A_3$, $A_4$. Phasing in hybrid network 88 and difference channel 94 is such that it provides a signal indicative of the difference between lobes E, $E^1$ in the elevation plane. Thus an error signal is provided in two orthogonal planes, which signal is zero in both planes when the attitude of satellite 10 is orientated with respect to a reference provided by RF signal axis 38. Deviation of the attitude of satellite 10 from a prescribed orientation with respect to RF signal axis 38 provides an error signal in either azimuth or elevation plane which may be supplied to the satellite stabilization system or telemetered to a ground command station for corrective action.

The invention provides, therefore, an improved antenna system for producing a directive field pattern and attitude sensing of a spin stabilized communication satellite. While specific embodiments have been described with particularity, it should be obvious to those skilled in the art that modifications and variations thereof may be resorted to. For example, instead of a reflective beam collimator, a transmissive collimating aperture (i.e., dielectric lens) may be used. In this instance the beam is collimated in the azimuth plane by permitting the primary antennas to transmit through the collimator, with the function of the parasitic radiators remaining the same. In addition, the shaped beam in the elevation plane may be displaced from a position normal to the aperture by phase shifting and signal processing techniques and the use of phase controlled matrices to provide a two dimensional steering of the undirectional beam. Other drive means than the synchronous motor and the control electronics therefor specifically described may be utilized to rotate the beam collimator at the same angular velocity and in the opposite direction as the spin rate of the spacecraft. For example, a system for providing sine and cosine signals of a frequency related to spacecraft spin rate, substantially as described in the aforesaid article in Space/Aeronautics magazine, may be utilized for synchronous motor drive. Other radiating elements than the collinear array of half-wave dipoles shown may be utilized to provide the desired field pattern in the vertical plane, and other reflectors or beam collimators may be utilized to collimate the beam in the azimuth plane. It is therefore to be understood that within the scope of the appended claims the invention may be practiced otherwise than specifically set forth.

What is claimed as new and desired to be secured by Letter Patent of the United States is:

1. A communication satellite comprising: a spacecraft adapted to spin about an axis; at least one primary antenna fixed to said spacecraft; said primary antenna including at least one radiating element disposed coextensive with said axis; collimating means positioned radially from said radiating element and adapted to rotate about said axis; and drive means for rotating said collimating means at substantially the same angular velocity and in the opposite direction as the spin of said spacecraft.

2. A communication satellite comprising: a spacecraft adapted to spin around an axis; at least one primary antenna fixed to said spacecraft, said primary antenna including at least one radiating element disposed coextensive with said axis; collimating means positioned radially from said radiating element and adapted to rotate about said axis; drive means for rotating said collimating means at substantially the same angular velocity and in the opposite direction as the spin of said spacecraft; and ejection means for jettisoning said collimating means from said spacecraft.

3. A communication satellite comprising: a spacecraft adapted to spin about an axis; at least one primary antenna fixed to said spacecraft, said primary antenna including at least one radiating element disposed coextensive with said axis and adapted to provide a field pattern directive in a plane parallel to said axis; collimating means positioned radially from said radiating element and rotatable about said axis, said collimating means adapted to collimate said field pattern in a plane perpendicular to said axis; drive means for rotating said collimating means about said axis in a direction opposite to the spin of said spacecraft; and control means synchronizing the speed of rotation of said collimating means with the spin of said spacecraft.

4. The communication satellite defined in claim 3 and wherein said primary antenna includes a plurality of collinear radiating elements, each said radiating element being a discrete radiator equivalent to a line source aperture.

5. The communication satellite defined in claim 3 and including a plurality of primary antennas each operable at a different frequency.

6. The communication satellite defined in claim 3 and wherein said collimating means includes a cylindrical parabolic reflector positioned on one side of said radiating element and parasitic radiators positioned on the opposite side of said radiating element, said reflector and said parasitic radiators being mechanically joined to rotate as a unitary structure about said radiating element.

7. The communication satellite as defined in claim 6 and wherein said drive means includes a split turntable adapted to rotate about said axis with said cylindrical parabolic reflector and said parasitic radiators being mounted on different halves of said split turntable, said ejection means being adapted to simultaneously jettison both halves of said split turntable from said spacecraft.

8. A communication satellite comprising: a spacecraft adapted to spin about an axis; at least one primary antenna fixed to said spacecraft, said primary antenna including at least one radiating element disposed coextensive with said axis and adapted to provide a field pattern directive in a plane parallel to said axis; collimating means positioned radially from said radiating element and rotatable about said axis, said collimating means adapted to collimate said field pattern in a plane perpendicular to said axis; drive means for rotating said collimating means about said axis in a direction opposite to the spin of said spacecraft; control means for synchronizing the speed of rotation of said collimating means with the spin of said spacecraft; and ejection means for jettisoning said collimating means from said spacecraft.

9. The communication satellite as defined in claim 8 and wherein said drive means includes a turntable adapted to rotate about said axis, with said collimating means being mounted on said turntable, said ejection means being adapted to jettison said turntable from said spacecraft.

10. The communication satellite as defined in claim 9 and wherein said drive means further includes an electric motor for rotating said turntable, with the speed of said motor being synchronized with the spin of said spacecraft by said control means.

11. The communication satellite defined in claim 10 and wherein said control means is responsive to a command signal telemetered from a remote ground command station to advance and retard the rotor positioning of said motor relative to a radio frequency signal axis perpendicular to the spin axis of said spacecraft.

12. In a space vehicle spinning about an axis, an antenna system for providing a unidirectional field pattern for communication with a remote point and for determining the attitude of said spin axis with respect to a radio frequency signal axis extending between said space vehicle and said remote point, said antenna system including in combination: at least one antenna array fixed to said space vehicle, said antenna array including radiating elements extending coextensive with the spin axis of said space vehicle and adapted to provide a field pattern directive in a plane parallel to said spin axis; collimating means positioned radially from said radiating elements and adapted to rotate about said spin axis, said collimating means collimating said field pattern in a plane perpendicular to said spin axis; drive means for rotating said collimating means at substantially the same angular velocity and in the opposite direction as the spin of said space vehicle; first circuit means coupled to said antenna array for combining signal components therefrom to produce a first signal for communication between said remote point and said space vehicle; and second circuit means coupled to said radiating elements for combining signal components therefrom to produce a second signal indicative of the attitude of said spin axis with respect to said radio frequency signal axis extending between said space vehicle and said remote point.

13. The antenna system defined in claim 12 and wherein said drive means includes a turntable adapted to rotate about said axis, with said collimating means being mounted on said turntable.

14. The antenna system defined in claim 13 and wherein said drive means further includes an electric motor for rotating said turntable, with the speed of said motor being synchronized with the spin of said spacecraft by said control means.

15. The antenna system defined in claim 14 and wherein said control means is responsive to a command signal telemetered from a remote point advance and retard the rotor positioning of said motor relative to said radio frequency signal axis.

16. In a space vehicle spinning about an axis, an antenna system for providing a unidirectional field pattern for communication with a remote point and for determining the attitude of said spin axis with respect to a radio frequency signal axis extending between said space vehicle and said remote point, said antenna system including in combination: at least one antenna array fixed to said space vehicle, said antenna array comprising at least two radiating elements extending coextensive with the spin axis of said space vehicle and adapted to provide a field pattern directive in a plane parallel to said spin axis; collimating means positioned radially from said radiating elements and adapted to rotate about said spin axis, said collimating means collimating said field pattern in a plane perpendicular to said spin axis; drive means for rotating said collimating means at substantially the same angular velocity and in the opposite direction as the spin of said space vehicle, first circuit means coupled to said radiating elements for combining signal components therefrom to produce a first signal for communication between said remote point and said space vehicle; and second circuit means coupled to said radiating elements for combining signal components therefrom to produce a second signal indicative of the attitude of said space vehicle in a plane parallel to said spin axis.

17. In a space vehicle spinning about an axis, an antenna system for providing a unidirectional field pattern for communication with a remote point and for determining the attitude of said spin axis with respect to a radio frequency signal axis extending between said space vehicle and said remote point, said antenna system including in combination: at least one antenna array fixed to said space vehicle, said antenna spray comprising at least two radiatiing elements extending coextensive with the spin axis of said space vehicle and adapted to provide a field pattern having directivity in a plane parallel to said spin axis; collimating means positioned radially from said radiating elements and adapted to rotate about said spin axis, said collimating means collimating said field pattern in a plane perpendicular to said spin axis; drive means for rotating said collimating means about said spin axis in a direction opposite to the spin of said space vehicle; control means for synchronizing the speed of rotation of said collimating means with the spin of said space vehicle; ejection means for jettisoning said collimating means from said space vehicle; first circuit means coupled to said radiating elements for combining signal components therefrom to produce a first signal for communication between said remote point and said space vehicle; and second circuit means coupled to said radiating elements for combining signal components therefrom to produce a second signal indicative of the attitude of said space vehicle in a plane parallel to said spin axis.

18. The antenna system defined in claim 17 and wherein said collimating means includes a cylindrical parabolic reflector positioned on one side of said radiating elements and parasitic radiators positioned on the opposite side of said radiating elements, said cylindrical parabolic reflector and said parasitic radiators being mechanically joined to rotate as a unitary structure about said radiating elements.

19. The antenna system defined in claim 18 and wherein said drive means includes a split turntable adapted to rotate about said spin axis, with said cylindrical parabolic reflector and said parasitic radiators being mounted on different halves of said split turntable, said ejection means being adapted to simultaneously jettison both halves of said split turntable from said space vehicle.

20. The antenna system defined in claim 19 and wherein said drive means further includes an electric motor for rotating said turntable, with the speed of said motor being synchronized with the spin of said space vehicle by said control means.

21. In a space vehicle spinning about an axis, an antenna system for providing a unidirectional field pattern for communication with a remote point and for determining the attitude of said spin axis with respect to a signal axis extending between said space vehicle and said remote point, said antenna system including in combination: at least one antenna array fixed to said space vehicle, said antenna array comprising first radiating elements positioned coextensive with the spin axis of said space vehicle and the second and third radiating elements positioned on opposite sides of said first radiating elements; collimating means positioned radially from said antenna array and adapted to rotate about said spin axis; drive means for rotating said collimating means at the same angular velocity and in opposite direction as the spin of said space vehicle; first circuit means coupled to said antenna array for combining signal components therefrom to produce a sum signal for communication between said remote point and said space vehicle; second circuit means coupled to selected radiating elements of said antenna array for combining signal components therefrom to provide a difference signal indicative of the attitude of said space vehicle in a plane parallel to said spin axis; and third circuit means coupled to selected radiating elements of said antenna array for combining signal components therefrom to produce a difference signal indicative of the attitude of said space vehicle in a plane perpendicular to said spin axis.

22. In a space vehicle spinning about an axis, an antenna system for providing a unidirectional field pattern for communication with a remote point and for determining the attitude of said spin axis with respect to a signal axis extending between said space vehicle and said remote point, said antenna system including in combination: at least one antenna array fixed to said space vehicle, said antenna array comprising first radiating elements positioned coextensive with the spin axis of said space vehicle and second and third radiating elements positioned on opposite sides of said first radiating elements; collimating means positioned radially from said antenna array and adapted to rotate about said spin axis; drive means for rotating said collimating means about spin axis a direction opposite to the spin of said space vehicle; control means for synchronizing the speed of rotation of said collimating means with the spin of said space vehicle; ejection means for jettisoning said collimating means from said space vehicle; first circuit means coupled to said antenna array for combining signal components therefrom to produce a sum signal for communication between said remote point and said space vehicle; second circuit means coupled to selected radiating elements of said antenna array for combining signals components therefrom to produce a difference signal indicative of the attitude of said space vehicle in a plane parallel to said spin axis; and third circuit means coupled to selected radiating elements of said antenna array for combining signal components therefrom to produce a difference signal indicative of the attitude of said space vehicle in a plane perpendicular to said spin axis.

23. The antenna system defined in claim 22 and wherein said collimating means includes a cylindrical parabolic reflector positioned on one side of said radiating elements and parasitic radiators positioned on the opposite side of said radiating elements, said cylindrical parabolic reflector and said parasitic radiators being mechanically joined to rotate as a unitary structure about said radiating elements.

24. The antenna system defined in claim 23 and wherein said drive means includes a split turntable adapted to rotate about said spin axis, with said cylindrical parabolic reflector and said parasitic radiators being mounted on different halves of said split turntable, said ejection means being adapted to simultaneously jettison both halves of said split turntable from said space vehicle.

25. The antenna system defined in claim 24 and wherein said drive means further includes an electric motor for rotating said turntable, with the speed of said motor being synchronized with the spin of said space vehicle by said control means.

26. In a satellite adapted to spin about an axis, radiating means for communicating with a remote body, radiant energy collimating means cooperating with said radiating means rotatable with respect to said axis, and means for rotating said collimating means at substantially the same angular velocity and in the opposite direction as the spin of said satellite.

27. The combination of claim 26 wherein said radiating means has its electrical center coextensive with said spin axis.

28. The combination of claim 27 wherein said collimating means is offset from said spin axis.

29. The combination of claim 28 and including at least one parasitic radiator offset from said radiating means opposite to said collimating means.

30. The combination of claim 26 and further including control means for synchronizing the rotational speed of said collimating means with the spin of said satellite.

31. The combination of claim 26 wherein said collimating means directs a beam of radiant energy perpendicular to said spin axis.

References Cited
UNITED STATES PATENTS
3,188,639   6/1965   Cook et al. _____ 343—100

FERGUS S. MIDDLETON, *Primary Examiner.*